United States Patent
de la Iglesia et al.

(10) Patent No.: US 8,959,288 B1
(45) Date of Patent: Feb. 17, 2015

(54) IDENTIFYING INVALID CACHE DATA

(75) Inventors: Erik de la Iglesia, San Jose, CA (US);
Som Sikdar, San Jose, CA (US);
Sivaram Dommeti, San Jose, CA (US);
Garry Knox, San Jose, CA (US)

(73) Assignee: Violin Memory, Inc., Santa Clara, CA (US)

( * ) Notice: Subject to any disclaimer, the term of this patent is extended or adjusted under 35 U.S.C. 154(b) by 1013 days.

(21) Appl. No.: 12/849,652

(22) Filed: Aug. 3, 2010

Related U.S. Application Data

(63) Continuation-in-part of application No. 12/846,568, filed on Jul. 29, 2010.

(51) Int. Cl.
*G06F 12/00* (2006.01)
*G06F 12/02* (2006.01)

(52) U.S. Cl.
CPC ................................. *G06F 12/0207* (2013.01)
USPC ...... 711/133; 711/169; 711/152; 711/E12.002

(58) Field of Classification Search
CPC .................................................. G06F 12/0207
USPC .................. 711/133, 167, 169, E12.002, 152
See application file for complete search history.

(56) References Cited

U.S. PATENT DOCUMENTS

| | | | |
|---|---|---|---|
| 5,604,753 A * | 2/1997 | Bauer et al. | 714/763 |
| 5,954,796 A | 9/1999 | McCarthy et al. | |
| 6,041,366 A | 3/2000 | Maddalozzo et al. | |
| 6,161,208 A * | 12/2000 | Dutton et al. | 714/764 |
| 6,401,147 B1 | 6/2002 | Sang et al. | |
| 6,636,982 B1 | 10/2003 | Rowlands | |
| 6,678,795 B1 | 1/2004 | Moreno et al. | |
| 6,721,870 B1 | 4/2004 | Yochai et al. | |
| 6,728,855 B2 * | 4/2004 | Thiesfeld et al. | 711/170 |
| 6,742,084 B1 | 5/2004 | Defouw et al. | |
| 6,789,171 B2 | 9/2004 | Desai et al. | |
| 6,810,470 B1 | 10/2004 | Wiseman et al. | |
| 7,017,084 B2 | 3/2006 | Ng et al. | |
| 7,089,370 B2 | 8/2006 | Luick | |
| 7,110,359 B1 | 9/2006 | Acharya | |
| 7,243,205 B2 * | 7/2007 | Freeman et al. | 711/200 |
| 7,594,085 B1 * | 9/2009 | Rao | 711/159 |
| 7,856,533 B2 | 12/2010 | Hur et al. | |
| 7,870,351 B2 | 1/2011 | Resnick | |

(Continued)

OTHER PUBLICATIONS

Mark Friedman, Odysseas Pentakalos. Windows 2000 Performance Guide. File Cache Performance and Tuning [reprinted online]. O'Reilly Media. Jan. 2002 [retrieved on Oct. 29, 2012]. Retrieved from the internet: <URL:http://technet.microsoft.com/en-us/library/bb742613.aspx#mainSection>.

(Continued)

*Primary Examiner* — Pierre-Michel Bataille
(74) *Attorney, Agent, or Firm* — Brinks Gilson & Lione

(57) ABSTRACT

Cache lines are identified that provide incorrect data for read requests. The cache lines are invalidated before the incorrect data causes processing failure conditions. The cache lines providing incorrect data may be detected according to a number of the same read requests to the same cache lines. The cache lines may also be identified according to an amount of time between the same read requests to the same cache lines. The same read requests to the same cache lines may be identified according to associated start addresses and address lengths.

17 Claims, 7 Drawing Sheets

(56) References Cited

U.S. PATENT DOCUMENTS

| | | | |
|---|---|---|---|
| 7,873,619 B1 | 1/2011 | Faibish et al. | |
| 7,975,108 B1 | 7/2011 | Holscher et al. | |
| 8,010,485 B1 | 8/2011 | Chatterjee et al. | |
| 8,190,951 B2 * | 5/2012 | Gille | 714/723 |
| 2002/0035655 A1 | 3/2002 | Finn et al. | |
| 2002/0175998 A1 | 11/2002 | Hoang | |
| 2002/0194434 A1 | 12/2002 | Kurasugi | |
| 2003/0012204 A1 | 1/2003 | Czeiger et al. | |
| 2003/0167327 A1 | 9/2003 | Baldwin et al. | |
| 2003/0177168 A1 | 9/2003 | Heitman et al. | |
| 2003/0210248 A1 | 11/2003 | Wyatt | |
| 2004/0128363 A1 | 7/2004 | Yamagami et al. | |
| 2004/0146046 A1 | 7/2004 | Jo et al. | |
| 2004/0186945 A1 | 9/2004 | Jeter et al. | |
| 2004/0215923 A1 | 10/2004 | Royer | |
| 2005/0025075 A1 | 2/2005 | Dutt et al. | |
| 2005/0195736 A1 | 9/2005 | Matsuda | |
| 2006/0005074 A1 | 1/2006 | Yanai et al. | |
| 2006/0034302 A1 | 2/2006 | Peterson | |
| 2006/0053263 A1 | 3/2006 | Prahlad et al. | |
| 2006/0075191 A1 | 4/2006 | Lolayekar et al. | |
| 2006/0112232 A1 | 5/2006 | Zohar et al. | |
| 2006/0212524 A1 | 9/2006 | Wu et al. | |
| 2006/0218389 A1 | 9/2006 | Li et al. | |
| 2006/0277329 A1 | 12/2006 | Paulson et al. | |
| 2007/0050548 A1 | 3/2007 | Bali et al. | |
| 2007/0079105 A1 | 4/2007 | Thompson | |
| 2007/0118710 A1 | 5/2007 | Yamakawa et al. | |
| 2007/0124407 A1 | 5/2007 | Weber et al. | |
| 2007/0192444 A1 | 8/2007 | Ackaouy et al. | |
| 2007/0233700 A1 | 10/2007 | Tomonaga | |
| 2007/0283086 A1 | 12/2007 | Bates | |
| 2008/0028162 A1 | 1/2008 | Thompson | |
| 2008/0098173 A1 | 4/2008 | Chidambaran et al. | |
| 2008/0104363 A1 | 5/2008 | Raj et al. | |
| 2008/0162864 A1 | 7/2008 | Sugumar et al. | |
| 2008/0215827 A1 | 9/2008 | Pepper | |
| 2008/0215834 A1 | 9/2008 | Dumitru et al. | |
| 2008/0250195 A1 | 10/2008 | Chow et al. | |
| 2008/0320269 A1 | 12/2008 | Houlihan et al. | |
| 2009/0006725 A1 | 1/2009 | Ito et al. | |
| 2009/0006745 A1 | 1/2009 | Cavallo et al. | |
| 2009/0034377 A1 | 2/2009 | English et al. | |
| 2009/0110000 A1 | 4/2009 | Brorup | |
| 2009/0164727 A1 * | 6/2009 | Penton et al. | 711/118 |
| 2009/0240873 A1 | 9/2009 | Yu et al. | |
| 2009/0259800 A1 | 10/2009 | Kilzer et al. | |
| 2009/0262741 A1 | 10/2009 | Jungck et al. | |
| 2009/0276588 A1 | 11/2009 | Murase | |
| 2009/0307388 A1 | 12/2009 | Tchapda | |
| 2010/0011154 A1 | 1/2010 | Yeh | |
| 2010/0030809 A1 | 2/2010 | Nath | |
| 2010/0080237 A1 | 4/2010 | Dai et al. | |
| 2010/0088469 A1 | 4/2010 | Motonaga et al. | |
| 2010/0115206 A1 | 5/2010 | de la Iglesia et al. | |
| 2010/0115211 A1 | 5/2010 | de la Iglesia et al. | |
| 2010/0122020 A1 | 5/2010 | Sikdar et al. | |
| 2010/0125857 A1 | 5/2010 | Dommeti et al. | |
| 2010/0169544 A1 | 7/2010 | Eom et al. | |
| 2010/0174939 A1 | 7/2010 | Vexler | |
| 2011/0047347 A1 | 2/2011 | Li et al. | |
| 2011/0258362 A1 | 10/2011 | McLaren et al. | |
| 2012/0198176 A1 | 8/2012 | Hooker et al. | |

OTHER PUBLICATIONS

Stolowitz Ford Cowger Listing of Related Cases, Feb. 7, 2012.

Rosenblum, Mendel and Ousterhout, John K., The LFS Storage Manager. Proceedings of the 1990 Summer Usenix. 1990 pp. 315-324.

* cited by examiner

IDENTIFYING INVALID CACHE DATA

The present application is a continuation in part of U.S. patent application Ser. No. 12/846,568 filed on Jul. 29, 2010 which is herein incorporated by reference in its entirety.

BACKGROUND

Processing elements send memory access requests to memory systems. The processing elements may resend the same memory access request if the data received back from the memory system is invalid, incorrect, corrupted, etc. The processing element will fail if the requested data is still invalid or incorrect after multiple memory access attempts. The processing element may then need to be restarted or rebooted.

In many computer architectures different devices, applications, or elements request data from the same memory system. The memory accesses from these different devices and applications can also be abstracted by other devices or processing elements. For example, an operating system may break a read request from a software application into a plurality of different individual read operations.

Memory access requests from different sources and the abstractions made by other processing elements make it difficult to correctly identify repeated memory access requests that are associated with incorrect or corrupted data.

DETAILED DESCRIPTION

Figure 1:
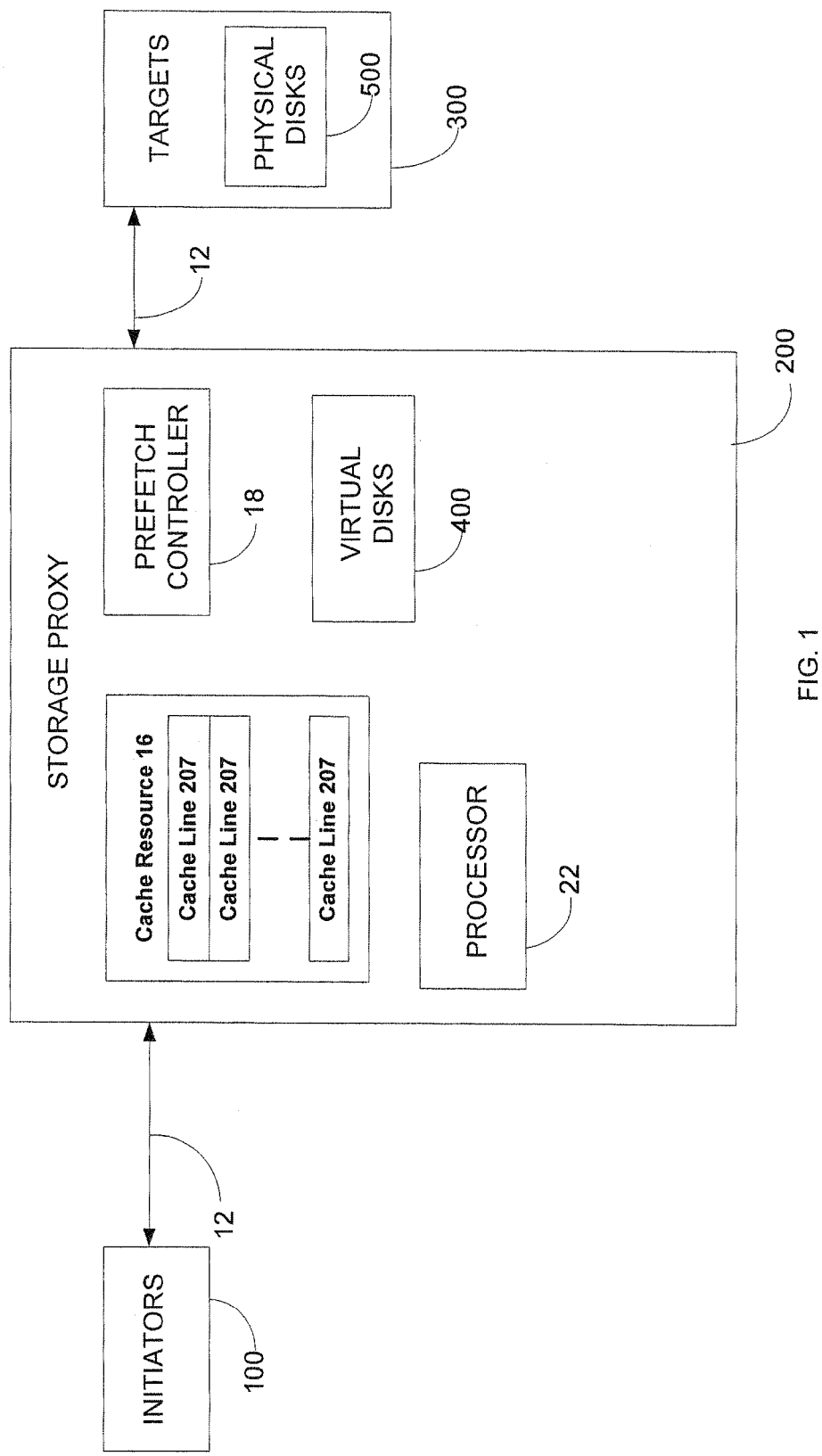
FIG. 1 is a block diagram of a storage proxy.

Referring to FIG. 1, a storage proxy 200 is deployed between initiators 100 and targets 300. The initiators 100 can be any device or application that writes and reads data to and from another device. The targets 300 can be any device that stores data that is accessed by another device, application, software, initiators, etc. In some embodiments, the targets 300 are storage devices or storage servers that contain storage media such as solid state memory and/or storage disks. In one embodiment, the targets 300 may also contain multiple storage disks that are referred to generally as a disk array.

The initiators 100 and targets 300 can be directly connected, or connected to each other through a network or fabric. In some embodiments, the initiators 100 are servers, server applications, routers, switches, client computers, personal computers, Personal Digital Assistants (PDA), smart phones, or any other wired or wireless computing device that needs to access the data in targets 300.

In one embodiment, the initiators 100 may be stand-alone appliances, devices, or blades, and the targets 300 are stand-alone storage arrays. In some embodiments, the initiators 100, storage proxy 200, and targets 300 are each coupled to each other via wired or wireless Internet connections 12. In other embodiments, the initiators 100 may be a processor or applications in a personal computer or server that accesses one or more targets 300 over an internal or external data bus. The targets 300 in this embodiment could be located in the personal computer or server 100, or could also be a stand-alone device coupled to the computer/initiators 100 via a computer bus or packet switched network connection.

The storage proxy 200 could be hardware and/or software located in a storage appliance, wireless or wired router, gateway, firewall, switch, or any other computer processing system. The storage proxy 200 provides an abstraction of physical disks 500 in targets 300 as virtual disks 400. In one embodiment, the physical disks 500 and the virtual disks 400 may be identical in size and configuration. In other embodiments the virtual disks 400 could consist of stripes of data or volumes of data that extend across multiple different physical disks 500.

Different communication protocols can be used over connections 12 between initiators 100 and targets 300. Typical protocols include Fibre Channel Protocol (FCP), Small Computer System Interface (SCSI), Advanced Technology Attachment (ATA) and encapsulated protocols such as Fibre Channel over Ethernet (FCoE), Internet Small Computer System Interface (ISCSI), Fibre Channel over Internet Protocol (FCIP), ATA over Ethernet (AoE) and others. In one embodiment, the communication protocol is a routed protocol such that any number of intermediate routing or switching agents may be used to abstract connection 12.

The initiators 100 conduct different storage operations with the physical disks 500 in targets 300 though the storage proxy 200. The storage operations may include write operations and read operations that have associated storage addresses. These interactions with storage proxy 200 and other components of storage proxy 200 may be normalized to block-level operations such as "reads" and "writes" of an arbitrary number of blocks.

Storage proxy 200 contains a cache resource 16 used for accelerating accesses to targets 300. The cache resource in FIG. 1 includes an array of cache lines 207 that include both cache memory that store data and registers and logic that may be used for maintaining a state for the different cache line 207 in cache resource 16. The cache memory associated with cache lines 207 could be implemented with any memory device that provides relatively faster data access than the targets 300. In one embodiment, the cache resource 16 could be any combination of Dynamic Random Access Memory (DRAM) and/or Flash memory. However, other types of relatively faster memory could also be used.

A prefetch controller 18 includes any combination of software and/or hardware within storage proxy 200 that controls cache resource 16. For example, the prefetch controller 18 could be a processor 22 that executes software instructions that when executed by the processor 22 conduct the analysis and invalidation operations described below.

During a prefetch operation, prefetch controller 18 performs one or more reads to targets 300 and stores the data in cache resource 16. If subsequent reads from initiators 100 request the data in cache resource 16, storage proxy 200 returns the data directly from cache resource 16. Such a direct return is referred to as a "cache hit" and reduces the read time for applications on initiators 100 accessing targets 300. For example, a memory access to targets 300 can take several milliseconds while a memory access to cache resource 16 may be in the order of microseconds.

Prefetch controller 18 can operate in both a monitoring mode and an active mode. When operating in the monitoring mode, the prefetch controller 18 monitors and records read and write operations from initiators 100 to targets 300. The prefetch controller 18 uses the monitored information when performing subsequent caching operations.

FIGS. 2-9 show how memory access requests can be abstracted prior to being received by the storage proxy 200. Keep in mind that in one embodiment the storage proxy 200 operates as an intermediary between the initiators 100 and targets 300. Thus, in at least one embodiment, the storage proxy 200 is not privy to certain abstractions that may take place before receiving the memory access request on connection 12. The storage proxy 200 may also have no idea what applications originated the memory access requests.

As mentioned above, an initiator 100 may resend a memory access request several times when the data received back from the storage proxy 200 is incorrect or corrupted. It would be advantageous for the storage proxy 200 to identify these invalid error conditions and then invalidate the cache lines 207 that contain the erroneous data before the initiator 100 fails. Memory accesses from different originating computing elements have to be correctly identified in order to correctly anticipate and avoid these failure conditions. However, memory access requests may come from different initiators and may be abstracted by different software and hardware elements.

For example, the storage proxy 200 may receive memory access requests that are broken up into different portions and sent at different times. Further, the different portions of the broken up memory access requests may overlap with other broken up memory access requests from other computing elements. These disjointed overlapping memory access requests make it difficult for the storage proxy 200 to accurately identify the processing elements that originated the memory access requests.

Figure 2:
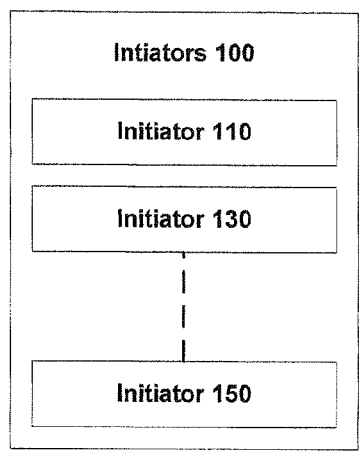
FIG. 2 shows different physical initiators that may initiate memory access requests.

FIG. 2 shows one embodiment of the initiators 100 of FIG. 1 in more detail. In this example, there may be multiple different physical or logical initiators 110, 130, 150, etc. that each independently initiate memory access requests to targets 300. For example, a physical initiator may be an independently operating server, computing element, processor, software module, etc. Logical initiators could be separate processing threads or logical software abstractions that independently initiate memory access requests. Because the storage proxy 200 may not know which initiators generate the memory access requests, it may be difficult to identify memory access patterns for the individual initiators 110, 130, and 150.

Figure 3:
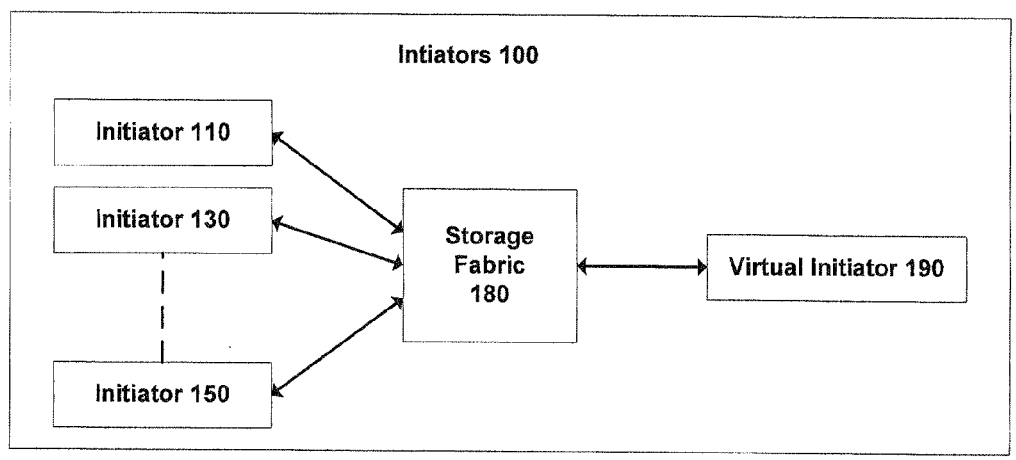
FIG. 3 shows how the memory access requests from the initiators in FIG. 2 can be abstracted by a storage fabric.

FIG. 3 shows an abstraction where the initiators 100 include different physical or logical initiators 110, 130, and 150 that each accesses the targets 300 in FIG. 1 through a storage fabric 180. The storage fabric 180 may abstract the memory access requests received from all of the differentiate initiators 110, 130, and 150 into one virtual initiator 190. For example, the storage access requests from initiators 110, 130, 150 may all be repartitioned by a protocol such as FCP, SCSI, ATA, FCoE, ISCSI, AoE, etc. into other memory access requests that are interleaved and sent over the storage fabric 180. All of the repartitioned memory access requests are sent over the same storage fabric 180 and appear to the storage proxy 200 as all coming from one virtual initiator 190.

Figure 4:
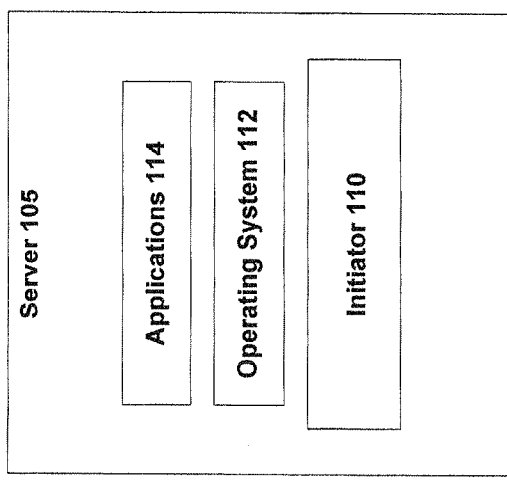
FIG. 4 shows how different computing elements in a server can abstract a memory access request.

FIG. 4 shows one embodiment where the initiator 110 is a Host Bus Adapter (HBA) fiber channel card located in a server or PC 105. The server 105 runs an operating system 112 and different applications 114 that run on top of the operating system 112. For example, a spreadsheet application 114 may need to read a 1 MegaByte (MB) file. The read is passed from the spreadsheet application 114 to the operating system 112 that then passes the read request to the HBA card 110.

The HBA card 110 asserts signals on a fiber channel bus connection 12 in FIG. 1 that requests the data from the targets 300. The storage proxy 200 receives the data access requests over the connection 12 and then either forwards the requests to the targets 300, or if available, supplies the requested data from the cache resource 16 in FIG. 1.

Figure 5:
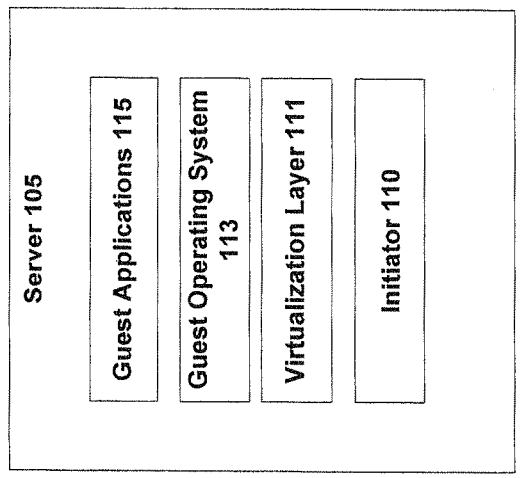
FIG. 5 shows how a virtualization layer in the server of FIG. 4 can further abstract a memory access request.

FIG. 5 shows an even more complex abstraction where a virtualization layer 111 such as VMware™ runs on the server or other computer system 105. Different guest applications 115 operate on top of guest operating systems 113.

Some of the guest applications 115 and guest operating systems 113 may be the same as the applications 114 and operating system 112, respectively, in FIG. 4. However an additional layer of abstraction provided by the virtualization layer 111 allows the different guest operating systems 113 to operate as if they run natively on the computer 105. As in FIG. 4, the HBA card 110 asserts signals on the fiber channel bus connection 12 in FIG. 1 that request data from the targets 300. The memory access requests on connection 12 are intercepted by the storage proxy 200. The storage proxy 200 can provide the requested data if the data is located in the cache resource 16. Otherwise the storage proxy 200 accesses targets 300 to obtain the data associated with the memory access requests.

The virtualization and abstractions comprise the differences between the memory access requests originally issued by the applications 114 and/or 115 in FIGS. 4 and 5 and the resulting read and write commands that are sent over the hardware bus or other connection 12 that are interpreted by the storage proxy 200.

Figure 6:
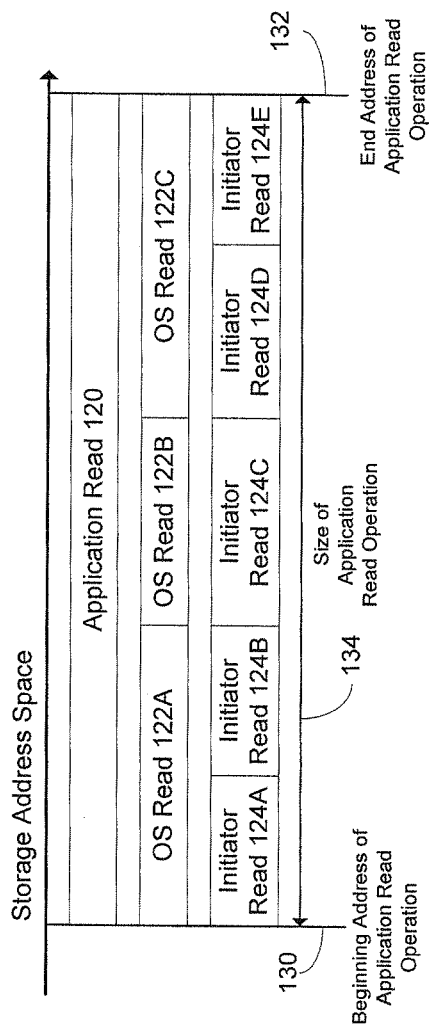
FIG. 6 is a schematic diagram showing one example of how the address of an application read is abstracted by an operating system and a storage fabric initiator.

FIG. 6 explains these virtualizations or abstractions in more detail. An application 114 in FIG. 4 may initiate an application read 120. The left vertical line 130 represents a beginning address of the application read 120 and the right vertical line 132 represents an ending address of the application read 120. The horizontal line 134 between vertical line 130 and vertical line 132 represents the size of the application read 120. For example, a spreadsheet application 114 may initiate a read request for a 1.5 MB file. Line 130 represents the starting address of the 1.5 MB read and line 132 represents the ending address of the 1.5 read.

The operating system 112 in FIG. 4 may only have a 0.5 MB buffer and therefore may need to break the 1.5 MB application read 120 into three separate Operating System (OS) reads 122A, 122B, and 122C. The first OS read 122A has a starting address 130 and the second OS read 122B has a starting address that begins at the ending address of OS read 122A. The third OS read 122C has a starting address that starts at the ending address of OS read 122B and an ending address 132. The operating system 112 sends the three OS reads 122A, 122B and 122C to the HBA card/initiator 110 in FIG. 4 for sending to the targets 300.

The HBA card/initiator 110 may have yet another buffer size or a particular configuration or state that further abstracts the OS reads 122A, 122B, and 122C. For example, the HBA card 110 may break the first OS read 122A into two separate initiator reads 124A and 124B. The first initiator read 124A has the same starting address 130 as application read 120 and OS read 122A. The second initiator read 124B has a starting address that starts at the ending address of initiator read 124A and has the same ending address as OS read 122A.

The HBA card/initiator 110 may not dissect or abstract the second OS read 122B. In other words, the third initiator read 124C may have the same starting address as OS read 122B and the same ending address as OS read 122B. The HBA card/initiator 110 separates the third OS read 122C into two separate initiator reads 124D and 124E. The starting address of the fourth initiator read 124D starts at the starting address of OS read 122C. The fifth initiator read 124E starts at the ending address of initiator read 124D and has the same ending address 132 as application read 120 and OS read 122C.

It can be seen that the operating system 112 and the initiator 110 in FIG. 4 abstracts the read sizes of the previous upper processing element. It can also be seen that each series of read abstractions starts at the same beginning address 130 and ends at the same ending address 132. There could be additional layers of abstractions. For example, there could be a multipathing abstraction layer between the operating system layer 122 and the initiator layer 124. A cache layer could also exist between the application layer 120 and the operating system layer 122 as described below.

In one embodiment of the present invention, the interpretation of application reads by the system is bypassed such that the initiator or OS level read commands are used. The subsequently described method of identifying invalid cache data performs correctly regardless of the read operation layer (application, operating system or initiator as shown in FIG. 6) chosen for analysis. However, the use of higher level operations (such as interpreted application level reads) reduces the overall transaction count and thus increases the speed at which the system can operate.

Figure 7:
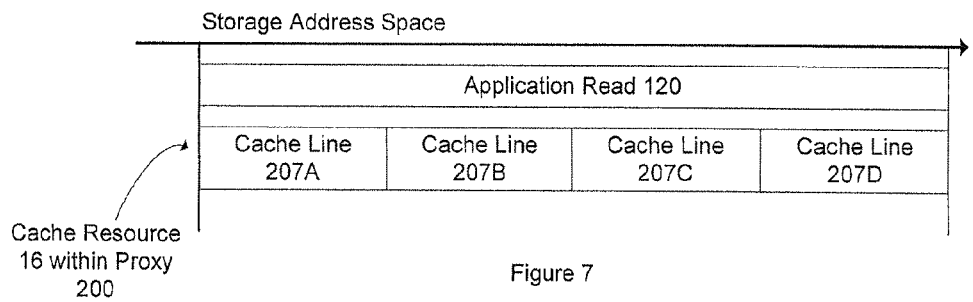
FIG. 7 is a schematic diagram showing how multiple cache lines are used for the same application read.
Figure 8:
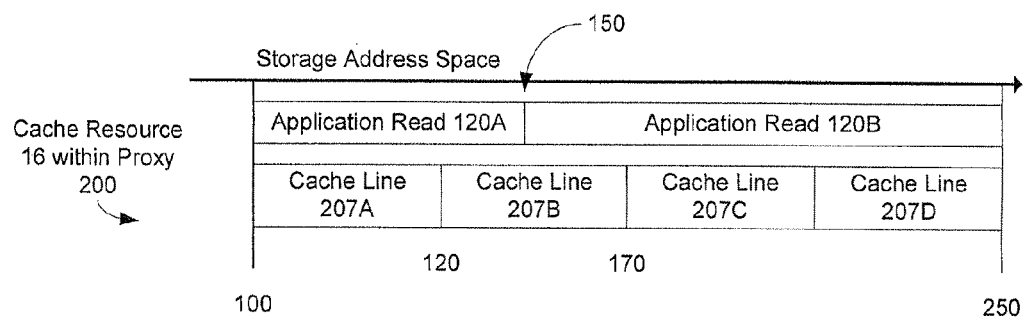
FIGS. 8 and 9 show how different cache lines are used for different application reads.
Figure 9:
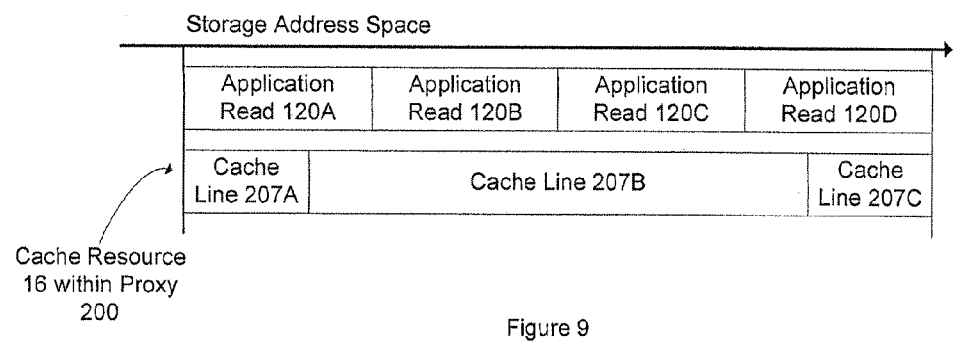

FIGS. 7-9 demonstrate how different cache lines 207 of the cache resource 16 in FIG. 1 may be accessed for different application reads 120. As mentioned above, application reads 120 are used as example read access operations. However, it should be understood that the read operations could be originated and received from any element and represent any abstraction layer in the initiators 100 of FIG. 1. The original read requests could be abstracted in any number of different levels by any number of different processing elements in any number of different initiators 100. Thus, the application reads 120 refer to any read operation performed by any processing element that is then received by the storage proxy 200.

In FIG. 7 four cache lines 207A, 207B, 207C, and 207D are used by the storage proxy 200 in FIG. 1 for servicing the application read 120. The processor 22 in FIG. 1 determines if any of the cache lines 207A, 207B, 207C, or 207D have addresses within the address range of application read 120. If so, this is referred to as a "cache hit" and the processor 22 uses the data in the identified cache lines 207 to service the application read request 120 from the initiator 100.

For example, responsive to the application read 120 in FIG. 7, the storage proxy 200 fetches data from each of cache lines 207A, 207B, 207C, and 207D. Cache line 207A may contain data for a first address range of the application read 120, cache line 207B may contain data a second address range, cache line 207C a third address range, and cache line 207D a fourth address range. Based on the state of the data in the cache resource 16, almost any combination and number of cache lines 207 may be accessed pursuant to different application reads 120.

FIG. 8 shows another example where cache line 207A and part of cache line 207B are accessed for application read 120A. A portion of the data in cache line 207B is accessed a second time along with data from cache lines 207C and 207D for application read 120B.

FIG. 9 shows another example where data from cache lines 207A and 207B are accessed a first time for application read 120A. Cache line 207B is accessed a second time for application read 120B and accessed a third time for application read 120C. Cache line 207B is accessed a fourth time for application read 120D and cache line 207C is accessed once for application read 120D.

Identifying Invalid Data Conditions

For any variety of reasons, the data in a particular cache line 207 may not be the correct data requested by one of the initiators 100. For example, a particular state of the storage proxy 200 may load the wrong data from the targets 300 into a particular cache line 207. In another situation, the storage proxy 200 may load invalid data or the wrong data into a particular cache line 207 at the wrong time. In other situation, due to some hardware glitch, data in a particular cache line 207 may be corrupted even though the correct data was loaded from the targets 300. A variety of other hardware or software conditions may result in one or more of the cache lines 207 containing corrupted or incorrect data. In some cases, the incorrect data is due to initiator errors, such as inconsistent multipath configuration, rather than an error within storage proxy 200.

Certain applications 114 or other processing elements in the initiators 100 may initiate a read operation to the targets 300 and receive back data from one of the cache lines 207 in storage proxy 200. The application or processing element determines if the correct data is received back from the storage proxy 200. For example, data values, checksums, configuration bits, etc. may be compared with the data received back from the storage proxy 200.

The application 114 may resend the same application read 120 a number of times if the data received back from the storage proxy 200 is incorrect. If the wrong data continues to be received back from the storage proxy 200, the application 114 may simply fail. For example after five read retries, the application 114 may go into a failure state and require a restart or reboot to start operating again. The number of retries that will be performed may be configurable or a fixed number based on the application programming. In some applications, the decision to retry may be based on configuration.

The detection system described below identifies these incorrect data conditions and automatically invalidates the data in the identified cache line. Because the cache line 207 is invalidated, a subsequent read retry operation from the application 114 causes the storage proxy 200 to access the data from the targets 300. One of the cache lines 207 may then be reloaded with the valid data read from targets 300 so that the storage proxy 200 can then start providing the correct data to the application 114. The application 114 can then continue operating and processing data without going into a failure state.

The storage proxy 200 may normally consider each application read 120A, 120B, 120C, and/or 120D in FIGS. 7-9 to be a unique and sequential read operation. However, due to the different initiators 100 and/or data abstractions described above, the storage proxy 200 may receive multiple hits to the same cache line 207 that are all associated with a single application read 120.

These repeated hits to the same cache line 207 could appear to the storage proxy 200 as an invalid data retry condition from one of the applications 114. However, the repeated hits to the same cache line 207 may actually be from multiple different initiators 110, 130, and 150 in FIG. 3. Alternatively, the repeated hits to the same cache line 207 may be from multiple initiator read abstractions 124A-124E in FIG. 6 that are all part of the same application read 120.

The storage proxy 200 distinguishes multiple cache line hits from repeated abstracted read operations from multiple cache line hits caused by invalid cache line data. The storage proxy 200 identifies the cache lines with bad data and automatically invalidates the identified cache lines 207. This automatic invalidation avoids application failures.

Figure 10:
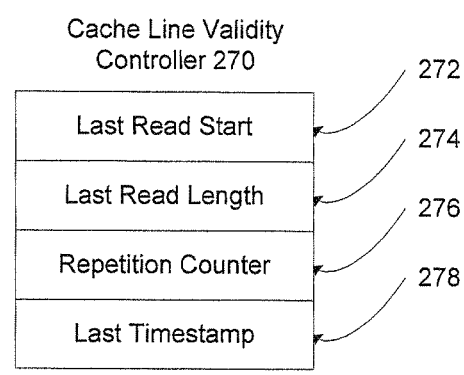
FIG. 10 is a block diagram showing a cache line invalidity controller.

Referring to FIG. 10, a cache line validity controller 270 is provided for each cache line 207 in the cache resource 16 of FIG. 1. The cache line controllers 270 each include a last read start register 272, a last read length register 274, a repetition counter 276, and a last timestamp register 278. Of course these logic elements could be any buffer or memory element that retains state information from a previous memory access request.

Using FIG. 8 as an example, the application read 120A may start at address 100 and end at address 150. The application read 120B may start at address 150 and end at address 250. The cache line 207A starts at address 100 and ends at address 120, and the cache line 207B starts at address 120 and ends at address 170.

Of course, the start of application read 120B may be the next sequential address after address 150 and the start of cache line 207B may be the next sequential address after address 120. However, for illustration purposes the ending address of application read 120A is also shown as the starting address of application read 120B. Similarly, the ending address of cache line 207A is shown as the starting address of cache line 207B.

The last read start register 272 in FIG. 10 identifies the start address in the cache line hit for the last application read 120. The last read length register 274 identifies how far the last application read 120 extends across the hit cache line 207. The repetition counter 276 identifies the number of times the associated cache line 207 is accessed or "hit" for that particular read start address and read length. The last timestamp register 278 identifies that last time that particular cache line 207 has been accessed with that particular read start address and read length.

For example, after receiving application read 120A, the address value in last read start register 272 for cache line 207A is 100 and the value in last read length register 274 is 20. If this is the first hit on cache line 207A, the repetition counter 276 will be set to one and the last timestamp register 278 will be set to a current time associated with the application read 120A.

After receiving application read 120A, the address value in last read start register 272 for cache line 207B is set to 120 and the value in last read length register 274 for cache line 207B is set to 30. This corresponds to the starting address of cache line 207B at address 120 and a read length that starts at cache line address 120 and extends to the end of application read 120A at address 150. If this is the first hit on cache line 207B, the value in repetition counter 276 is set to 1 and the value in last timestamp register 278 is set to a current time associated with application read 120B.

Since there is no hit on cache line 207A after receiving the second application read 120B, there is no change to the control registers 270 associated with cache line 207A. However after receiving application read 120B, the address value in last read start register 272 for cache line 207B is set to 150 and the value in last read length register 274 for cache line 207B is set to 20. This corresponds to the starting address of the application read 120B at address 150 and a read length that starts at address 150 and extends to the end of cache line 207B at address 170. Since this is the latest hit on cache line 207B with this particular start address and read length, the value in repetition counter 276 for cache line 207B is reset to one and the value in last timestamp register 278 is reset to a current time of application read 120B.

Compare this to a second application read 120A sent immediately after the first application read 120A. For example, instead of receiving application read 120A in FIG. 8 followed by application read 120B, the storage proxy 200 receives application read 120A followed by the same application read 120A with the same starting address 100 and ending address 150.

In this case there is a second hit on cache line 207A after receiving the first application read 120A. The second application read 120A will have the same start address as the last read start register 272 and will have the same length as the last read length register 274 for cache line 207A. Accordingly, the processor 22 in FIG. 1 will increment repetition counter 276 and the timestamp value in the last timestamp register 278 for cache line 207A will be updated to the current time associated with the second application read 120A.

Figure 11:
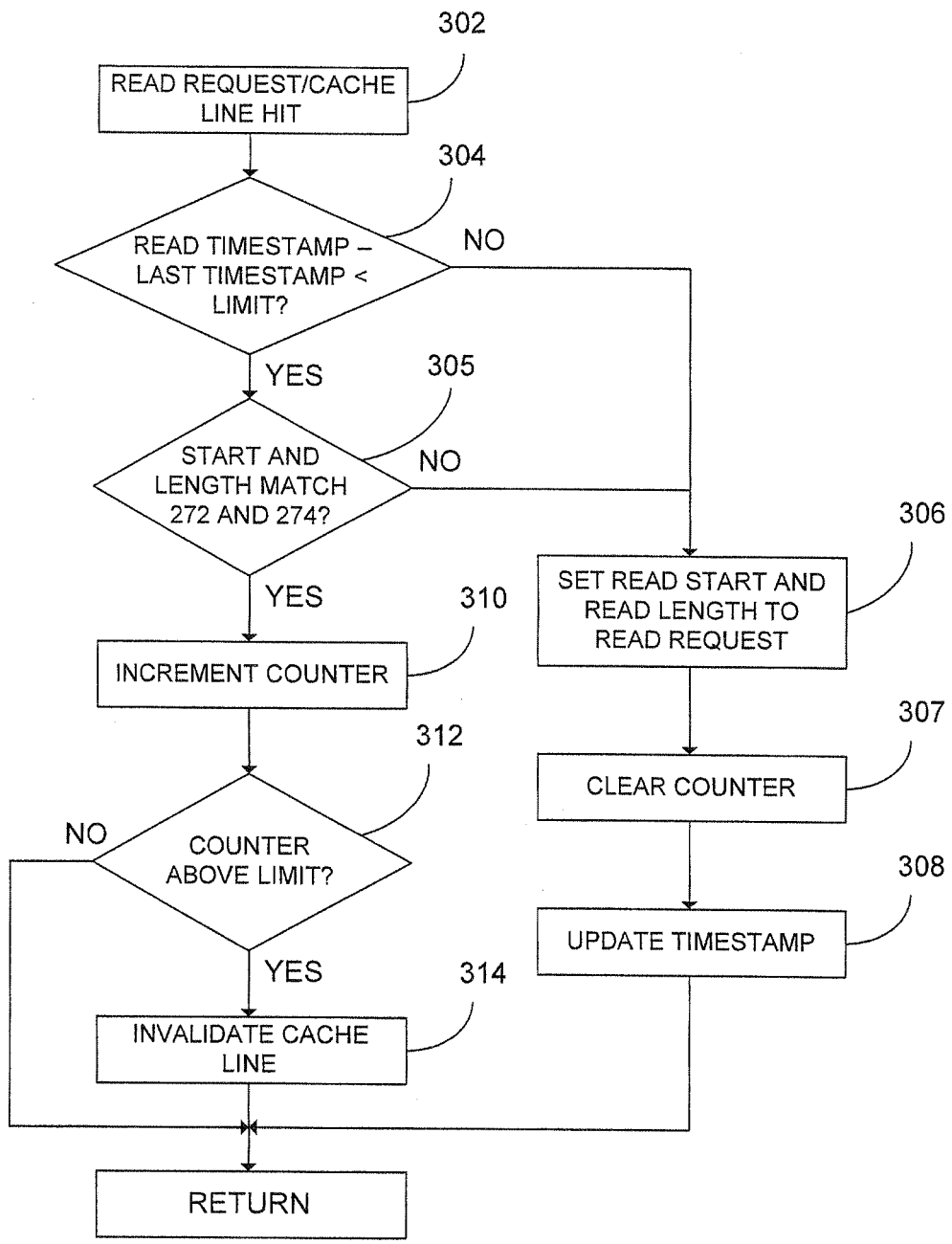
FIG. 11 is a flow diagram showing how the invalidity controller in FIG. 10 is used to invalidate cache lines.

FIG. 11 shows how the storage proxy 200 uses the information in the invalidity controllers 270 shown in FIG. 10 to selectively invalidate cache lines 207. In operation 302 the storage proxy 200 receives a read request from one of the initiators 100 and identifies a hit for one or more cache lines 207. In operation 304 the storage proxy 200 determines if the timestamp for the received read request is within some time threshold of the timestamp value in last timestamp register 278 for the hit cache line 207.

If the time difference is outside of a given time threshold in operation 304, the start address value and address length value for the received read request are loaded or set into the registers 272 and 274, respectively, for the associated cache line 207 in operation 306. The count value in repetition counter 276 for the associated the cache line 207 is cleared or reset to one in operation 307. The timestamp value in last timestamp register 278 for the associated cache line 207 is set to the current time associated with the received read request in operation 308.

The time threshold checked in operation 304 is used to distinguish repeat back-to-back hits to the same cache line 207 caused by invalid cache line data from normal hits to the same cache line that are not due to bad cache line data. For example, if the same cache line hit for the same start address and address length happens outside of the given time threshold, the second cache line hit may be associated with a second valid data request for the same data.

Operation 305 compares the start address value in last read register 272 for the hit cache line 207 with the start address of the received read request. Operation 305 compares the address length value in last read length register 274 for the associated cache line 207 with the address length of the received read request.

A different start address or different read length in the registers 272 or 274 than the received read request indicates two different read operations that just happen to hit the same cache line 207. The storage proxy 200 considers this a normal read operation that is not associated with back-to-back read requests that may be associated with invalid cache line data.

Accordingly, in operation 306 the processor 22 in storage proxy 200 sets the registers 272 and 274 with the start address and read length, respectively, of the latest received read request. The value in counter register 276 is reset in operation 307 and the value in timestamp register 278 is updated to the time associated with the new read request in operation 308.

The time of the latest read request may be within the predetermined time threshold of the timestamp value in last timestamp register 278 in operation 304. And, the start address and read length of the received read request may also match the values in registers 272 and 274 in operation 305. This indicates an application 114 that may have made the same two back-to-back read requests for the same data. This also indicates that the application 114 may have made the same back-to-back application reads 120 because the data returned back from the cache line 207 in the previous read was incorrect.

Accordingly, the storage proxy 200 in operation 310 increments the value in repetition counter register 276 for the hit cache line after receiving the second read request. The storage proxy 200 in operation 312 determines if the value in repetition counter 276 is above a predetermined limit. For example, a database application 114 may be known to repeat the same read request five times if the data received pursuant to the read request continues to be incorrect. After five read retries, the database application 114 may fail and require rebooting or a resetting. Of course any number of retries may be used by a particular application 114.

The counter limit in operation 312 is set to some number below the database failure retry number. For example, the counter limit in operation 312 may be set to three. If the value in repetition counter 276 is less than three in operation 312, the storage proxy 200 returns to receive the next read request in operation 302. If the value in repetition counter 276 reaches the limit of three in operation 312, the storage proxy 200 invalidates the cache line 207 in operation 314. The cache line is invalidated by setting an invalid bit in the cache resource 16 associated with the hit cache line 207. Other schemes may also be used for invalidating cache lines.

Invalidating the cache line 207 causes the storage proxy 200 to send the next read request associated with that cache line address to the targets 300 in FIG. 1. The data read from the targets 300 may be valid compared to the previous data stored in the cache line 207. Based on the algorithms used by the cache resource 16, the data read from the targets 300 also may be reloaded back into one of the cache lines 207.

If the data read from the targets 300 is valid, the application 114 can continue operating without any more read request retries. Thus, the storage proxy 200 invalidates the corrupted or incorrect data in the cache line 207 and provides the correct data for the read request from targets 300. This prevents a failure condition in the application 114.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims

The invention claimed is:

1. An apparatus, comprising:
a memory configured to store data as cache lines; and
logic circuitry configured to:
characterize memory access requests of a plurality of memory access requests by;
a read start address; and
a read length,
wherein the logic circuitry is configured to increment a count value when a next memory access request to the cache line is characterized by a same read start address as the read start address and a same read length as the read length;
identify potentially incorrect stored data in a cache line of the cache lines based on the characterized memory access requests of at least two memory access requests of the plurality of memory requests; and
invalidate the potentially incorrect stored data in the cache line.

2. The apparatus of claim 1 wherein the logic circuitry is configured to reset the count value when the next memory access request has a different read start address than the read start address or the next memory access request has a different read length than the read length.

3. The apparatus according to claim 2 wherein the logic circuitry is configured to identify the potentially incorrect stored data in the cache line when the count value is above a given count threshold.

4. The apparatus of claim 3 wherein the logic circuitry is configured to:
set a time value a corresponding to the memory access request to the stored data in the cache line having the start address and the read length; and
reset the time value when the next memory access request has the same read start address as the read start address and a same read length as the read length.

5. The apparatus according to claim 4 wherein the logic circuitry is configured to invalidate the cache line with identified potentially incorrect stored data when the count value is above the given count threshold and a time value corresponding to the next memory access request is within a given time threshold of time value.

6. The apparatus according to claim 1 wherein the memory and logic circuitry comprise a storage proxy configured to intercept the memory access request sent from initiators to storage targets and provide data responsive to the memory access request either from storage targets or from the memory.

7. The apparatus of claim 6 wherein the logic circuitry in the storage proxy is configured to invalidate the requested cache lines and forward the memory access request to the storage targets when characteristics of the memory access request indicates that the requested stored data in the cache line is potentially incorrect.

8. The apparatus according to claim 1 identification is determined by a number of times memory access requests with a same characteristic are made to the cache line.

9. The apparatus according to claim 1 wherein the identification is determined by an amount of time between memory access requests with a same characteristic are made to the cache line.

10. The apparatus of claim 1, wherein the apparatus is storage proxy disposed between a initiator and a target.

11. The apparatus of claim 1, wherein the logic circuitry includes a processor.

12. A non-volatile computer readable storage medium containing instructions executable by a computer, the instructions when executed by the computer comprising:
storing a first read start address for a previous read operation accessing a cache line;
storing a first read length for the previous read operation;
identifying a second read start address for a subsequent read operation accessing the cache line;
identifying a second read length for the subsequent read operation;
identifying the subsequent read operation as a reread operation when the first read start address matches the second read start address and the first read length matches the second read length;
incrementing a count value when the subsequent read operation is identified as the reread operation; and
invalidating the cache line when the count value is above a given threshold.

13. The computer readable medium according to claim 12 further comprising resetting the count value when the subsequent read operation is not the reread operation.

14. The computer readable medium according to claim 12 further comprising setting the threshold below a reread failure condition of a processing element sending the read operations.

15. The computer readable medium according to claim 12 further comprising replacing the stored first read start address with the second read start address and replacing the stored first read length with the second read length when the subsequent read operation is not the reread operation.

16. The computer readable medium according to claim 12 further comprising:
storing a first time value for the previous read operation;
identifying a second time value for the subsequent read operation; and
invalidating the cache line when the count value is above the given threshold and a time difference between the first time value and the second time value is within a given time threshold.

17. The computer readable medium according to claim 16 further comprising replacing the stored first read start address with the second read start address, replacing the stored first read length with the second read length, clearing the count value, and updating the first time value with the second time value when the time difference between the first time value and the second time value is not within the given time threshold.

* * * * *